United States Patent [19]

de Rancourt et al.

[11] Patent Number: 4,935,290

[45] Date of Patent: Jun. 19, 1990

[54] HEAT-SUPERSTABILIZED SEMI-FINISHED PRODUCTS CONTAINING THERMOPLASTICS RESIN

[76] Inventors: Hubert de Rancourt, 53 Ter rue Sermorens, 38500 Voiron; Xavier Gambert, La Favetière, 38850 Charavines, both of France

[21] Appl. No.: 86,523

[22] Filed: Aug. 18, 1987

[30] Foreign Application Priority Data

Sep. 29, 1986 [FR] France .................................. 86 12259

[51] Int. Cl.⁵ ........................ B32B 7/02; B32B 27/08; D21F 11/00
[52] U.S. Cl. .................................... 428/212; 428/517; 428/519; 428/521; 162/127; 162/128; 162/160; 162/164.1
[58] Field of Search ................... 428/212, 319.7, 411.1, 428/517, 519, 521; 138/118, 140; 162/123, 127, 128, 160, 164.1

[56] References Cited

U.S. PATENT DOCUMENTS 2,645,249 7/1953 Davis et al. .
3,518,153 6/1970 Slosberg et al. .
3,582,418 6/1971 Schuur .
3,755,069 8/1973 Crawford et al. .................. 162/160
4,320,175 3/1982 Hisazumi .
4,451,539 5/1984 Vallee et al. ........................ 428/516
4,645,565 2/1987 Vallee et al. ........................ 152/123

FOREIGN PATENT DOCUMENTS 1106270 8/1981 Canada .
2380132 9/1978 France .
2506316 11/1982 France .
1181249 2/1970 United Kingdom .
2050247 1/1981 United Kingdom .
1590769 6/1981 United Kingdom .

*Primary Examiner*—George F. Lesmes
*Assistant Examiner*—Dennis V. Carmen

[57] ABSTRACT

This heat-superstabilized semi-finished product containing thermoplastic resin is constituted of at least two layers: at least one surface layer S designed to be exposed to a source of heat and at least one other layer C which is not directly exposed to said source of heat, said layer S having an overall content by weight of stabilizer which is between 3 and 30 times greater than that of layer C, and said layer S having a surface density between 50 and 600 g.m.$^{-2}$.

12 Claims, No Drawings

HEAT-SUPERSTABILIZED SEMI-FINISHED PRODUCTS CONTAINING THERMOPLASTICS RESIN

The present invention relates to a semi-finished product containing thermoplastics resin and more particularly semi-finished products such as multiply materials in cardboard and paper.

BACKGROUND OF THE INVENTION

Plates are already known which are constituted of a thermoplastics resin reinforced with continuous or cut glass fibers, and which are produced by extrusion-laminating or by hot-densification of sheets, such as described in U.S. Pat. Nos. 4,645,565 and 4,451,539 whose teachings are incorporated herein by way of reference. These plates are designed to be transformed by molding-stamping or by thermo-shaping and to this effect they have to undergo a pre-heating treatment.

Among preferred pre-heating methods, infrared or hot air drying are the most used in industry and offer a very oxidizing environment. During that operation, the initially dense plates undergo a phenomenon of expansion as the melting of the resin progresses, this phenomenon being due to the fact that the glass fibers resume their original spatial shape. Such expansion results in a drop in the thermal conductibility, this entailing an overheating of the surface of the materials and their deterioration in the case of intensive supplies of energy. Yet, in order to reach the target rate of transformation, the supply of energy has to be intensive and therefore the material to be transformed has to have a good thermal resistance, clearly above that conventionally used in the other plastic transformation methods, such as injection and extrusion. Therefore, the level of thermal resistance which is required imposes the necessity of introducing a large quantity of thermal stabilizer, during the preparation of the material. It is well known to anyone skilled in the art that such proportions, i.e. several percent by weight, are to the detriment of the mechanical properties, of the smell, of the external appearance, etc. Moreover, such adjunction considerably increases the costs.

SUMMARY OF THE INVENTION

It is the object of the present invention to propose a semi-finished thermoplastic resin containing product which can withstand a thermal treatment involving an intensive supply of energy, while retaining its properties.

To this effect, the present invention proposes a semi-finished product constituted of at least two layers, namely at least one surface layer S designed to be exposed to a source of heat and at least one other layer C which is not directly exposed to said source of heat, said layer S having an overall content by weight of stabilizer which is between 3 and 30 times greater than that of layer C, and said layer S having a surface density between 50 and 600 g.m.$^{-2}$.

In other words, the semi-finished product according to the invention has the following formula:

$$\frac{3\Sigma x(C)}{Y(C)} \leq \frac{\Sigma x(S)}{Y(S)} \leq \frac{30\Sigma x(C)}{Y(C)}$$

in which:

$\Sigma \times (S)$ = weight of stabilizer contained in layer S
$\Sigma \times (C)$ = weight of stabilizer contained in layer C
$Y(S)$ = total weight of S
$Y(C)$ = total weight of C By thermal source here is meant a heating means by circulation of hot air or by a radiant energy such as infrared radiations.

By "stabilizer" is meant an additive selected from additives conventionally used by anyone skilled in the art for protecting thermoplastic resins both through their transformation and long-term ageing, since it is well known that a number of agents, and in particular antioxidants, have more or less that double property.

If the thermal stabilization of the layer S is required to ensure the protection of the plate during the transformation, it should also be sufficient to ensure, after transformation, the resistance to thermal ageing of the resin of said layer S.

The semi-finished product obtained according to the invention is a "superstabilized" semi-finished product, i.e. a product of which the surface layer or layers S, which during the heating receive the incident energy, comprise a total percentage by weight of thermal stabilizer which is between 3 and 30 times greater than that of layer or layers C which, being in the depth of the semi-finished product, are only heated through heat conductibility at the contact with an adjacent layer.

The stabilizer may be of different nature or of similar nature within the different layers.

One layer may contain at least two different stabilizers.

Said stabilizers are preferably a heat protecting agent and an anti-ageing agent. Preferably, at least layer S contains a transformation stabilizer, and layers S and C contain an anti-ageing agent. The thickness of layer S is preferably 700 micrometers maximum in order to ensure the required protection.

According to a variant, at least part of the surface layer S comprises a heat-superstabilized film of thermoplastic resin.

According to another variant, the semi-finished product only has one surface layer S which has the said overall proportion by weight of stabilizer between 3 and 30 times greater than that of layer C.

Preferably, at least one of the two layers S and C contains a paper-making material.

One application of the invention relates to the production of thermoplastics articles involving a heat treatment, such as the production of accessories for the motorcar industry.

DETAILED DESCRIPTION OF THE INVENTION

The invention will be more readily understood on reading the following description and examples given by way of illustration and non-restrictively.

The semi-finished product containing thermoplastics resin is constituted of at least two main layers, which are:

- a layer S, situated on the surface of said semi-finished product, which is designed to be exposed to a source of heat, and
- a layer C, which is not directly exposed to said source of heat.

A number of variants are possible: a core layer C between two surface layers S or a layer C coated with only one layer S, if the exposure to heat only occurs on one face of the semi-finished product.

The semi-finished product can further comprise other components in addition to the said main layers, such as a base layer other than a layer S or intermediate elements between layers S and C.

Also, each one of layers S and C can in turn be composed of a plurality of sheets, obtained by the paper-making methods, such as taught for example in the documents cited in the preamble of the present description.

In each of the following examples, the material entirely densified into plates is exposed in an infrared radiation furnace of 4.2 micrometers wavelength at maximum power, of 20 kW/m2 power density, for just as long as it is necessary to melt the resin in the core of the plate, i.e. a temperature of 180° C. for a polyethylene polypropylene matrix. The thermal stability during the transformation is noted by observing the test piece weighing about 120 g which is obtained after the molding-stamping operation.

The stabilizers used in the following examples are antioxidants, the percentages of which are given by weight of antioxidant with respect to the total weight of the layer into which they are introduced, whereas the average proportions are calculated with respect to the total weight of the plate.

EXAMPLE 1

(control sample)

A plate of 4.5 kg/m2 formed by hot-densification of sheets of composition C1 prepared with 5% of antioxidant AOI, is pre-heated for 1 min. 30 secs. The corresponding molded piece shows a beginning of degradation, meaning that if the test is repeated in succession, there is a sign of degradation showing every other test.

EXAMPLE 2

The same pre-heating operation as in Example 1 is conducted on a plate of 4.5 kg/m2 composed of a layer of several sheets of composition C1 with 0.5% of antioxidant AGI, said layer being sandwiched between two layers S1, each one having 190 g/m2 (2 sheets) and containing 10% of antioxidant AOI. The average proportion of AOI is therefore only 1.73%, but the resulting molded piece shows no signs of degradation.

EXAMPLE 3

Using the same principle as in Example 2, the plates used have a core part of composition C1 with 0.5% of anti-oxidant AOI, with on the surface a sheet of 145 g/m2 of composition S1 with 10% of anti-oxidant.

At 4.5 kg/m2, with an average content of 1.11% of AOI, after 1 min. 30 secs. the molded piece only shows a beginning of degradation as in Example 1.

At 3.6 kg/m2, with an average content of 1.26% of AOI, after 1 min 10 secs, the molded piece shows no signs of degradation whatsoever.

The distribution of the plate in layers C and S is dependent on the overall surface density, hence of the time of exposure necessary to reach the temperature of transformation.

EXAMPLE 4

A plate of 4.5 kg/m2 having, as in Example 2, two layers S1 of 290 g/m2 with 10% of AOI, but this time having a core layer formed by sheets of composition C2 with 0.5% of AOI, is pre-heated. The resulting piece shows no signs of degradation, and has, for an average glass content of 26%, the same mechanical characteristics as the piece molded from a homogeneous composition C1 with 0.5% of AOI, after a pre-heating in mold conditions of power supply (between plates heated at 210° C.).

EXAMPLE 5

(Control sample)

A plate of 4.5 kg/m2 densified from sheets of composition C3, stabilized with 0.5% of antioxidant AOII and 1% of antioxidant AOIII, is pre-heated. The resulting piece shows signs of degradation.

EXAMPLE 6

This time, a plate of 4.5 kg/m2 constituted of a layer of composition C3 with 0.25% of AOII and 0.25% of AOIII, sandwiched between layers of a sheet of 300 g/m2 of composition S2 with 1.5% of AOII and 4% of AOIII, is pre-heated. The molded piece, for an average content of stabilizer of 1.17% (0.42% of AOII and 0.75% of AOIII) shows no signs of degradation whatsoever.

EXAMPLE 7

A plate of 4.5 kg/m2 constituted of a layer of composition C1 with 0.5% AOI, this time between 2 layers S3 of 100 micrometers thickness, containing 15% of AO IV. The molded piece with an average content of 1.09% stabilizer shows no signs of degradation.

EXAMPLE 8

Another infrared radiation furnace is used this time for molding an industrial piece of 3.5 mm average thickness, of drawing dimensions 73×42 cm, which is of complex shape with, in the third dimension, a distance of 13 cm between the end parts.

5 plates, 70×20 cm, and 3.5 kg/m2 are used, each one being composed of one layer of composition C1 with 0.5% AOI, sandwiched between two layers of a sheet of 380 g/m2 of composition S2 containing 0.25% of AO V and 4% of AO VI (average stabilizer content: 1.31%).

The piece shows no signs of degradation whereas when using plates of composition C1 only, it is impossible to obtain a piece which is altogether whole and non-degraded, whatever the furnace control conditions.

Moreover, despite the glass content difference between materials C and S, the piece has a glass content of 24.7±0.4%, whether the sampling is conducted on the initial plates or on the end of a piece after a course of 25 cm.

| Antioxidants | |
|---|---|
| AOI | 4,4'-Thiobis (2,1,1-dimethyl)-5-methyl)phenol. |
| AOII | Trimethyl-1,3,5-tris(di-tert-butyl-3,5) hydroxybenzyl-4)-2,4,6-benzene. |
| AOIII | Distearyl -3,3'-thiodipropionate. |
| AO IV | Pentaerythrityl-tetrakis 3-(3,5-di-tert.butyl-4-hydroxyphenyl)-propionate). |
| AO V | Bis (2-2'-methylene bis-(4-methyl-6-tertiary-butylphenol)) terephalate. |
| AO VI | 2,6- di-tert.-butyl-4-methylphenol. |
| Compositions C prepared according to U.S. Pat. No. 4,645,565 | |
| C1 | Glass fibers 26%; polyethylene pulp 15%; latex 5%; antioxidant; complement at 100% by weight of polypropylene powder. |
| C2 | Glass fibers 30; polyethylene pulp 10%; latex 5%; antioxidant; complement at 100% by weight of polypropylene powder. |
| C3 | Glass fibers 20%; polyethylene pulp 10%; latex 5%; |

-continued antioxidant; complement at 100% by weight of polypropylene powder.

Composition S

S1  According to U.S. Pat. No. 4,451,539. Polyethylene pulp 35%; latex 5%; antioxidant; complement at 100% by weight of polypropylene powder.
S2  According to U.S. Pat. No. 4,645,565 Identical to composition C3.
S3  Low density polyethylene film.

What is claimed is:

1. A heat-superstabilized semi-finished product comprising at least two thermoplastic containing layers, having as major component a thermoplastic material and capable of being subjected to further thermoprocessing including melting the thermoplastic in each of said thermoplastic layers without thermal degradation; said product having at least one surface layer S constituted by one of said at least two thermoplastic containing layers, designed to be exposed to a source of heat during said thermoprocessing and at least one other layer C, constituted by another one of said at least two thermoplastic containing layers, which is not directly exposed to said source of heat; said layer S having an overall content by weight of thermal stabilizer which is between 3 and 30 times greater than the amount of thermal stabilizer contained in layer C; and said layer S having a surface density between 50 and 600 g.m$^{-2}$.

2. A semi-finished product as claimed in claim 1, wherein at least layer S contains at least one transformation stabilizer.

3. A semi-finished product as claimed in claim 2, wherein said transformation stabilizer is also the anti-ageing agent.

4. A semi-finished product as claimed in claim 1, wherein said layers S and C contain at least one thermal anti-ageing agent.

5. A semi-finished product as claimed in claim 1, wherein said layer S has a maximum thickness of 700 micrometers.

6. A semi-finished product as claimed in claim 1, wherein at least part of said layer S comprises a heat-superstabilized film of thermoplastic resin.

7. A semi-finished product as claimed in claim 1, wherein only one surface layer S has the said overall content by weight of stabilizer between 3 and 30 times greater than that of said layer C.

8. A semi-finished product as claimed in claim 1, wherein at least one of the two layers contains a paper-making material.

9. A product transformed from the semi-finished product of claim 1 wherein said product has undergone molding-stamping or thermoshaping treatments.

10. A heat-superstabilized semi-finished product comprising at least two thermoplastic containing layers having as major component a thermoplastic material, and capable of being subjected to further thermoprocessing including melting the thermoplastic material in each of said thermoplastic layers without thermal degradation; said product having at least one surface layer S, constituted by one of said at least two thermoplastic containing layers obtained by a paper making method, designed to be exposed to a source of heat during said thermoprocessing, and at least of one other layer C, constituted by another one of said at least two thermoplastic containing layers obtained by a paper making method, which is not directly exposed to said source of heat; said layer S having an overall content by weight of thermal stabilizer which is between 3 and 30 times greater than the amount of thermal stabilizer contained in layer C; and said layer S having a surface density between 50 and 600 g.m.$^{-2}$.

11. A heat-superstabilized semi-finished product comprising at least two thermoplastic containing layers having as major component a thermoplastic material and capable of being subjected to further thermoprocessing including melting the thermoplastic material in each of the said thermoplastic layers without thermal degradation; said product having at least one surface layer S, constituted by one of said at least two thermoplastic coating layers composed of plurality of sheets, obtained by a paper making method, designed to be exposed to a source of heat during said thermoprocessing and at least one other layer C, constituted by another one of said at least two thermoplastic containing layers composed of a plurality of sheets obtained by a paper making method, which is directly exposed to said source of heat; said layer S having an overall content by weight of thermal stabilizer which is between 3 and 30 times greater than the amount of thermal stabilizer contained in layer C; and said layer S having a surface density between 50 and 600 g.m.$^{-2}$.

12. A heat-superstabilized semi-finished product for the production of accessories for the motorcar industry comprising at least two thermoplastic containing layers, having as major component a thermoplastic material and capable of being subjected to further thermoprocessing including melting the thermoplastic in each of said thermoplastic layers without thermal degradation; said product having at least one surface layer S constituted by one of said at least two thermoplastic containing layers, designed to be exposed to a source of heat during said thermoprocessing and at least one other layer C, constituted by another one of said at least two thermoplastic containing layers, which is not directly exposed to said source of heat; said layer S having an overall content by weight of thermal stabilizer which is between 3 and 30 times greater than the amount of thermal stabilizer contained in layer C; and said layer S having a surface density between 50 and 600 g.m.$^{-2}$.

* * * * *